United States Patent Office 3,654,068
Patented Apr. 4, 1972

3,654,068
FLAME RETARDANT FIRE BARRIER LAMINATE
Richard L. Muri, Ashland, Mass., assignor to Ludlow
Corporation, Needham Heights, Mass.
No Drawing. Continuation-in-part of application Ser. No. 625,442, Mar. 23, 1967. This application May 18, 1970, Ser. No. 38,584
Int. Cl. B32b 27/08, 27/20, 27/30
U.S. Cl. 161—251                                    5 Claims

ABSTRACT OF THE DISCLOSURE

A flame resistant barrier laminate consisting of (1) a first ply formed of a cellulosic paper impregnated with a halogenated resin and a compound from the arsenic group, (2) a second protective outer ply, and (3) an adhesive comprising a polymer of an unsaturated halogen-bearing monomer and a hydrated metal oxide such as alumina.

RELATED APPLICATION

This application is a continuation-in-part of Ser. No. 625,442 filed Mar. 23, 1967 by Richard L. Muri and entitled "Flame-Retardant Fire Barrier Construction," now abandoned.

BACKGROUND OF THE INVENTION

(A) Field of the invention

This invention relates to a novel fire-resistant barrier material.

(B) The prior art

A considerable amount of effort has been expended, over the years, in development of flame-retardant fire barrier constructions such as those used in jacketing insulation and other such applications. One approach has been to formulate barrier materials which, on subjection to fire, quickly decompose to liberate a dense, flame-smothering gas. Such an approach is utilized by Muri et al. in the work described in U.S. Pat. 3,202,567. Most earlier investigators have used large quantities of chlorinated compounds in formulating their laminants. Like Newkirk et al. in U.S. Pat. 3,034,939, most of these investigators used a major part of those halogens in the formulation of a heavy adhesive layer between plies. These compositions are usually hot-melt adhesives easily spreadable at, say, 250° F. and, consequently, are likely to melt and allow delamination of the plies in that critical period while the barrier material is exposed to heat but before flame actually reaches it. Normally such barriers required 50 to 150 lbs. per 3,000 square feet, dry weight of adhesive. Consequently, they tend to be excessively bulky and difficult to work with.

In situations where fire-resistance is substantially dependent on the evolution of smoke or gas, the generation of such smoke or gas requires decomposition of the adhesive component of the barrier material and this decomposition can result in "explosion" of the barrier material.

Thus such smoke- and gas-evolving barrier materials as described above did not fully meet the performance characteristics desired by users of such barrier materials.

It is to be noted that, in construction of such barrier materials as disclosed by Muri et al., it was desirable to use a flame-resistant kraft. Papers treated with salts such as diammonium sulfate, ammonium sulfamate, diammonium phosphate, diethanolamine sulfamate, sodium silicate, or borax have excellent flame retardant properties as long as they are kept dry. On exposure to high humidity, dew, fog, rain, steam, or the like, even the less hydroscopic of these salts tend to leach out, leaving a flammable sheet. Fire-resistant building products made using such papers can be most treacherous for it is never known what fire protection, if any, remains after exposure to moisture.

Impregnation with low-melting and low-odor halogenated hydrocarbons, such as paraffin or condensed aromatic structures, plus zinc and antimony compounds as synergists, gives both good flame retardancy and resistance to water leaching. However, there remain other difficulties with such papers. Such paper is difficult to fashion into useful structure.

Adhesives usually bond only to the halogenated hydrocarbon impregnant in such papers, because these impregnants normally will completely cover the fibers. When the impregnant melts at relatively low temperatures, the structure tends to delaminate. Moreover, these halogenated hydrocarbon fire retardants tend to dissolve in lacquers and oil base paints, discoloring them and preventing proper drying.

Only a limited amount of work had been done on use of laminates using polymeric halogen-bearing materials, probably because initial attempts at impregnation (i.e. attempting to saturate the dried sheet with latex) resulted in a paper wherein the particles end up largely as a surface coating. Moreover, since emphasis was being placed on smoke-and gas-evolving adhesive layers, there was no particular reasons to direct efforts in the direction of utilizing halogen-containing paper layers. It has been found that polymers such as poly-vinyl chloride and poly-vinylidiene chloride, when used as coatings on paper, bond very poorly to the cellulose fibers and even this limited bond is lost under moist conditions. Chlorinated paraffins are only poorly tolerated by these resins as plasticizers. Without plasticizers, however, coatings of such resins cause the laminant to be stiff and brittle.

SUMMARY OF THE INVENTION

Therefore it is an object of the invention to provide an improved fire-retarding barrier material.

Another object of the invention is to provide a fire-retarding barrier material which is highly resistant to structural destruction in fire, even when subjected to severe chemical change by the oxidative action of the fire.

Other objects of the invention will be obvious to those skilled in the art on reading the instant application.

The invention is based upon a structure comprising paper which is impregnated with a halogen-bearing hydrocarbon polymer and thereupon sealed to a protective ply material by certain select adhesives. These adhesives are based on polymers of unsaturated halogenated monomers vulcanized through a metal atom in combination with hydrated metal oxides.

The barrier material so prepared has the surprising attribute of forming, on exposure to fire, a hard carbonaceous char product which acts as an effective barrier to retard propagation of a flame front. Moreover, the material of the invention has less undesirable smoke evolution than materials known in the prior art.

The halogenated polymer-impregnated paper material may comprise any of the halogenated polymers. It is advantageous that the polymer contain at least 40%, by weight, of halogen. Moreover softening range of the polymer should not extend below 100° C. The former attribute is to assure the flame resistance of the paper; the latter attribute is to assure no delamination of the paper from the rest of the laminate because it softens or melts.

In addition to use of the halogenated polymer, the paper advantageously comprises a compound bearing a metal from the arsenic group. Antimony oxide is conveniently used. The antimony atom is believed to serve a number of functions by tieing up some chlorine devolved during heating as antimony oxychloride. Antimony oxychloride then tends to dessicate the cellulosic web and thereby accelerate the formation of a char structure by the impregnated paper.

The precise chemical nature of the halogenated organic polymer resin which is impregnated within the kraft paper substrate is not important. What is important is that the polymer carry sufficient halogen as a fire retardant, maintain its solid nature at temperatures below about 100° C., and generally fill the interstices of the paper sheet into which it is impregnated. One entirely suitable impregnated paper, containing also the requisite antimony oxide, is available from Mosinee Paper Company under the trade designation Duro-M-Flameproof.

This paper, on a moisture-free basis, comprises 3 to 18% by weight of metal oxide; 10 to 25% of a halogeneated polymer such as poly(vinylidene chloride) or poly(vinyl chloride), and 57 to 92% of kraft fiber.

As those skilled in paper-making and paper-impregnation will readily understand, a large number of polymer comprising 40% halogen can be either placed in the paper pulp during manufacture or impregnated in the paper subsequent to manufacture. Moreover prepolymers or monomers can be impregnated into the paper and cured therein. The first procedure is usually the most economical. Papers prepared in any of these ways are considered "impregnated" in accordance with the requirements of the invention.

Among the polymers that can be used are poly(vinyl halides) such as poly(vinyl chloride) and poly(vinylidene chloride); copolymers of such vinyl halides; polymers incorporating tetrakis (hydroxymethyl) phosphonium chloride, e.g. as described in Hooker Chemical Corporation Bulletins 91–A and 170; and polymers incorporating a prepolymer containing phosphorous, chlorine, and free hydroyl groups which is sold under the trade designation Pyrostop E–100 by the Richard Company and is useful in forming urethane and epoxy resins. Other polymers include polyester- and epoxy-type resins comprising tetrabromophthalic anhydride and resins utilizing as a building block thereof, the flame-retardant urethane-reactive polyols sold under the trade designation Fyrol by the Victor Division of Stauffer Chemical Company.

It is emphasized that, although some of these polymers might have drawbacks when utilized in formation of barrier materials using some of the adhesive formulations and coating techniques known to the prior art, such problems as encountered in the prior art does not interfere with their advantageous use as impregnants according to the present invention.

The polymeric component of the adhesive is formed of a vulcanizable high polymer such as neoprene (chloroprene), poly(vinyl chloride) or the like. The polymer should contain between 35 to 72 weight percent of a halogen. The adhesive should also contain an acid-accepting metal oxide vulcanizing agent to facilitate vulcanization of the halogenated high polymer, and a hydrated amphoteric metal oxide which functions as a catalytic agent in the flame retarding mechanism. The hydrated oxide can be, derived from such compounds as aluminum silicate, calcium silicate, and magnesium silicate or alumina. These compounds should preferably contain at least two molecules of "water of crystallization" per mole. Hydrated alumina containing at least two $H_2O$ groups is preferred; it does not tend to such a rapid evolution of gas as to disrupt the barrier material. About ten to 70 parts of hydrated alumina per 100 parts of adhesive polymer is most preferred.

The acid-accepting, metal-oxide, vulcanizing agent is preferably zinc oxide, but equivalent materials can be selected from lead oxide and magnesium oxide, iron oxide, and the like. Five to twenty parts of vulcanizing agent per 100 parts of adhesive polymer is most preferred.

The adhesive is used in an amount ranging from 10 to 30 pounds of polymer per 3,000 square feet of barrier material. The hydrated alumina is used in quantities ranging from about 10 to about 70 weight percent based on the high polymer component of the adhesive.

Among polymers, besides chloroprene, which are useful in forming the adhesive composition useful in the invention is poly(vinyl chloride), e.g. as provided in the latices sold under the trade designations Geon 151; Geon 351 and Geon 652 by B. F. Goodrich Chemical Co.

It is usually convenient to utilize polymers in latex form because film-forming polymers of high molecular weight and of higher softening points are readily available and easily manipulated in such form.

Although not absolutely essential, it is much preferred to use polymers, in both the adhesive and in the paper, which are substantially free of aromatic rings, i.e. polymers formed of halogenated aliphatic units. Aromatic polymers have been found to evolve a considerable amount of smoke which, although a desirable characteristic in some barrier materials known to the prior art, is somewhat of a nuisance in the barrier material of the invention.

The barrier material of the invention is a lightweight, durable, flame-resistant barrier construction having physical characteristics comparable to that of the previous untreated kraft laminates but with a flame and smoke rating that will satisfy the 90A ratings established by the National Board of Fire Underwriters.

This standard is "NBFU No. 90A, Standard of the National Board of Fire Underwriters for the Installation of Air Conditioning and Ventilating Systems of Other Than Residence Type as Recommended by the National Fire Protection Association," dated June 1960 and amended June 1962.

The Underwriters' Laboratories 90A Ratings required a flame spread of 25 or less and smoke development of 50 or less based on the following test standards:

|  | Flame | Smoke |
|---|---|---|
| Cement board | 0 | 0 |
| Red oak | 100 | 100 |

The test procedure to determine these values and values of material in relation to the specified values is set forth in a publication, Underwriters' Laboratories, Inc. "Standard Test Method for Fire Hazard Classification of Building Materials," subject 723, published August 1950 (Reprinted June 1957).

ILLUSTRATIVE EMBODIMENT OF THE INVENTION

In this application and accompanying drawings are shown and described a preferred embodiment of the invention and various alternatives and modifications thereof are suggested, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be abe to modify it and embody it in a variety of forms, each as may be best suited in the condition of a particular case.

WORKING EXAMPLE I

Laminations of a "Duro-M-Flameproof" kraft (40 pounds per ream of 3,000 square feet) and one mil aluminum foil were made using the following adhesive composition in the amount of 20 pounds per ream, dry weight:

Adhesive of the Invention | Parts by dry weight
--- | ---
Neoprene Latex at 50% solids (E. I. DuPont de Nemours & Co. under the trade designation Latex 400) | 60
Zinc Oxide dispersion at 50% solids | 8
Hydrated aluminum oxide | 30
Phenyl-beta-naphthylamine (antioxidant) | 1
Casein (mechanical stabilizer) water for 49% solid | 1

The resulting adhesive is an emulsion.

COMPARATIVE ADHESIVE I

This experiment is presented to provide a basis for comparing the barrier material of the invention with the barrier materials described in U.S. Patent 3,202,567 to Muri et al.:

An adhesive is prepared from the following formulation:

| | |
--- | ---
Polyvinyl acetate emulsion at 55% solids (obtained from Monsanto Chemical Co., under the trade name Gelva S-55) | 75
Tris-beta chloroethyl phosphate | 20
Sulfonamide-formaldehyde resin | 5
Water (to bring to 60% solids). |

The resulting adhesive is an emulsion.

COMPARATIVE ADHESIVE II

This example is presented to provide a basis for comparing the barrier material of the invention with the barrier material described in U.S. Patent 3,034,939 to Newkirk et al.

An adhesive is prepared from the following formulation:

| | |
--- | ---
40% Chlorinated paraffin [1] | 20
70% Chlorinated paraffin [2] | 30
Ethylene-vinyl acetate resin [3] | 10
Calcium carbonate | 40

[1] Obtained from Pearsall Chemical Corp., under the trade name CPG-A.
[2] Obtained from Diamond Alkali Chemical Co., under the trade name Chlorowax 70.
[3] Obtained from E. I. du Pont de Nemours & Co., under the trade name Elvax 150.

The resulting adhesive is a mot-melt adhesive.

COMPARATIVE ADHESIVE III

This example is presented to illustrate the effect of the absence of a hydrated metal compound such as alumina from the adhesive formulation.

An adhesive is prepared from the following formulation:

ADHESIVE IV

| | |
--- | ---
Carboxylated vinyl chloride/acrylic co-polymer [1] | 90
Zinc oxide dispersion | 5
Casein | 4
Epoxidized soybean oil | 1
Water (to 60% solids). |

[1] Obtained under the trade designation Geon 450 x 20 from B. F. Goodrich Co.

Each of the above four adhesives were used to form laminated barrier materials by sealing.

(A) A protective cover of one mil aluminum foil to a halogenated polymer-impregnated kraft paper weighing 40 lbs. per 3,000 sq. ft.

(B) A protective cover of one mil aluminum foil to a fire-retardant kraft treated with a mixture of diammonium phosphate and ammonium sulfamate.

Then these laminations were tested for by Test Method D-777-46 of the American Society for Testing Materials. Results are tabulated below in inches of char length. Test samples were 8 inches long.

RESULTS OF THE TESTS

| | Control samples | |
--- | --- | ---
| | Halogen resin-impregnated kraft | Phosphate-impregnated kraft
Adhesive of Working Example I | 1.5 | 2.5
Adhesive of Comparative Adhesive: | |
I | 2.5 | 3.0
II | 3.0 | 3.5
III | 3.2 | 3.2

Next samples of each material were exposed to 100% relative humidity at 120° F. for 30 days and dried. Still other samples were exposed to boiling water for five minutes and dried and still other samples were control samples given no special exposure to water.

| | Humidity-exposed samples | |
--- | --- | ---
| | Halogen resin-impregnated kraft | Phosphate-impregnated kraft
Adhesive of Working Example I | 1.5 | 8.0
Adhesive of Comparative Adhesive: | |
I | 2.6 | 8.0
II | 3.0 | 8.0
III | 3.1 | 8.0

| | Water boiled samples | |
--- | --- | ---
| | Halogen resin-impregnated kraft | Phosphate-impregnated kraft
Adhesive of Working Example I | 2.7 | 8.0
Adhesive of Comparative Adhesive: | |
I | 2.7 | 8.0
II | 3.1 | 8.0
III | 3.1 | 8.0

It will be observed that the adhesive of Working Example I used with the zinc-oxide and halogen-impregnated kraft gave superior resutls and that the results are dependent, not only on use of the particular paper, but also on using the adhesive of the Working Example I.

In order to further test the utility of the flame-barrier construction, sample constructions were tested using a test procedure set forth in detail in a publication, Underwriters' Laboratories, Inc., Subject 723, published August 1950, also listed as ASTM, E84-61.

A 21-inch by 25-foot sample of a laminate made with the adhesive of Example I, the aluminum foil and the halogenated resin-impregnated paper described above, was mounted at the top of a fire test chamber having gas burners at one end for a flame source, the velocity of air passing through the chamber being regulated at 240 ft. per minute. The flame applied is such that a test sample of Grade A oak becomes enveloped in flame throughout its entire length in 5.5 minutes. The sample prepared with the adhesive of Example I commenced to burn promptly on ignition of the flame, but had become extinguished within 15 seconds. No further burning occurred during the 10 minutes that the test continued.

The results of similar tests performed on several samples made with the adhesive of Working Example I (15 pounds per ream, dry weight) and various aluminum foils are as follows:

| | Flame spread | Smoke development |
--- | --- | ---
.00035" foil | 15 | 30
.0007" foil | 20 | 20
.0035" foil/#6 glass fiber admixed with adhesive | 15 | 22

From the results of the tests it can be seen that the results are well under the 90A ratings for flame and smoke established by the National Board of Fire Underwriters.

Additional tests were run at Underwriters' Laboratories using the non durable flame retardant treated kraft previously described and the adhesive from adhesives I and II. The following results were obtained:

|          | Flame spread | Smoke development |
|----------|--------------|-------------------|
| Adhesive: |             |                   |
| I        | 25           | 30                |
| II       | 25           | 75                |

As can be seen from the results, flame spreads are higher and in the case of Adhesive II, the smoke values are much higher. These higher values are attributed to delamination of the adhesive system between the kraft and the foil, low char development between the kraft and adhesive layer and the lack of any synergistic decomposition reaction between the treated cellulosic material (kraft) and the adhesive layer. The laminate of Working Example I, however, showed no delamination and the development of an extensive hard charred surface. Because of the synergistic interaction which takes place between the halogenated kraft and the adhesive, any cellulosic material on exposure to excessive heat is quickly converted to a hard carbonaceous mass which in turn effectively prevents the propagation of a flame front.

In addition to possessing excellent durable flame resistant properties and low smoke characteristics, constructions made from the above examples have high resistance to the passage of moisture vapor and are sufficiently flexible and strong to permit their use in packaging applications and further converting operations. Additionally, the paper laminates described above are free of any water-soluble components which would corrode metal in contact with them or which would leach out and reduce the fire resistant properties.

As will be obvious to those skilled in the art the laminate of the invention need not be entirely of a foil/kraft construction, but can be kraft/kraft, kraft/asbestos paper, kraft/vinyl film, or other combinations which are desirable to afford protection to the laminate in any particular application. In addition, these constructions can be reinforced with glass and other fibers during the laminating operation.

Functional or decorative surface coatings can be applied to either ply of the finished lamination. Such a coating would be used to contribute color, scuff resistance, flame resistance and other properties to the lamination. Additionallyfi the coated or uncoated constructions can be embossed, creped or otherwise treated to add to the flexibility or asthetic value of the finished product.

What is claimed is:
1. A fire-resistant barrier laminate material comprising:
   (A) a first ply consisting essentially of a cellulosic paper web impregnated with (1) a halogenated resin having a softening point above 100° C. and containing at least about 40% halogen by weight and (2) with a compound of a metal from the arsenic group.
   (B) a second ply and
   (C) an adhesive comprising:
      (1) a polymer of an unsaturated halogen-bearing monomer containing about 35% to 72% by weight of halogen and, for each 100 parts of said polymer,
      (2) 10 to 70 parts of hydrated aluminum oxide having at least two molecules of water of crystallization per mole and,
      (3) 5 to 20 parts of a vulcanizing agent; said adhesive forming means to glue said first ply to said second ply, and wherein the combination of said first ply and said adhesive is characterized by formation of a hard integral carbonaceous surface when subjected to fire.
2. A fire-resistant barrier as defined in claim 1 wherein said compound from the arsenic group is an antimony compound.
3. A fire-resistant barrier as defined in claim 2 wherein said antimony compound is antimony oxide.
4. A fire-resistant barrier as defined in claim 1 wherein said polymer of an unsaturated halogen-bearing monomer is a copolymer consisting of units of a vinyl halide or vinylidene halide.
5. The fire-resistant barrier of claim 1 wherein said vulcanizing agent is zinc oxide.

References Cited

UNITED STATES PATENTS

| 3,202,567 | 8/1965  | Muri et al.     | 161—162   |
| 3,305,431 | 2/1967  | Peterson        | 161—220 X |
| 2,968,637 | 1/1961  | Bowers          | 161—218 X |
| 3,034,939 | 5/1962  | Newkirk et al.  | 161—255 X |
| 3,473,993 | 10/1969 | Kepple et al.   | 161—218 X |

JOHN T. GOOLKASIAN, Primary Examiner

C. B. COSBY, Assistant Examiner

U.S. Cl. X.R.

156—333; 161—254, 256, 268, 270